United States Patent [19]

Roinestad

[11] Patent Number: 4,846,339

[45] Date of Patent: Jul. 11, 1989

[54] FLAT WIRE CONVEYOR WITH DIFFERENTIAL PITCH

[75] Inventor: Gerald Roinestad, Winchester, Va.

[73] Assignee: Ashworth Bros., Inc., Fall River, Mass.

[21] Appl. No.: 24,523

[22] Filed: Mar. 11, 1987

[51] Int. Cl.⁴ .............................................. B65G 17/06
[52] U.S. Cl. .................................................. 198/852
[58] Field of Search ................................ 198/852, 853

[56] References Cited

U.S. PATENT DOCUMENTS

| | | | |
|---|---|---|---|
| Re. 27,690 | 7/1973 | Roinestad et al. | 198/852 |
| 2,872,023 | 2/1959 | Bechtel, Jr. | 198/852 |
| 3,261,451 | 7/1966 | Roinestad | 198/852 |
| 4,078,655 | 3/1978 | Roinestad | 198/852 X |

FOREIGN PATENT DOCUMENTS

| | | | |
|---|---|---|---|
| 830287 | 3/1960 | United Kingdom. | |
| 1443665 | 7/1976 | United Kingdom | 198/853 |

*Primary Examiner*—Frank E. Werner
*Assistant Examiner*—Cheryl L. Gastineau
*Attorney, Agent, or Firm*—Banner, Birch, McKie & Beckett

[57] ABSTRACT

A flat wire conveyor belt comprising a plurality of tractive pickets, a plurality of connecting cross rods and a plurality of bar links is disclosed. Elongate openings in several of the wedge-shaped segments of each tractive picket adjacent the outer edge define a gap between the connecting rod and the adjacent surface of the openings during straight and lateral travel of the belt. Elongate openings in the remainder of wedge-shaped segments are in contact with the connecting rod in straight travel. Openings in the bar links define a gap between the connecting rod and an adjacent surface of the opening during straight travel of the belt. The remainder of the wedge-shaped segments thus carry a substantial tractive load during substantially straight travel of the belt, the bar links carry a substantial tractive load during travel around lateral curves, and the wedge-shaped segments adjacent the outer convex edge of the belt never carry a substantial tractive load.

24 Claims, 3 Drawing Sheets

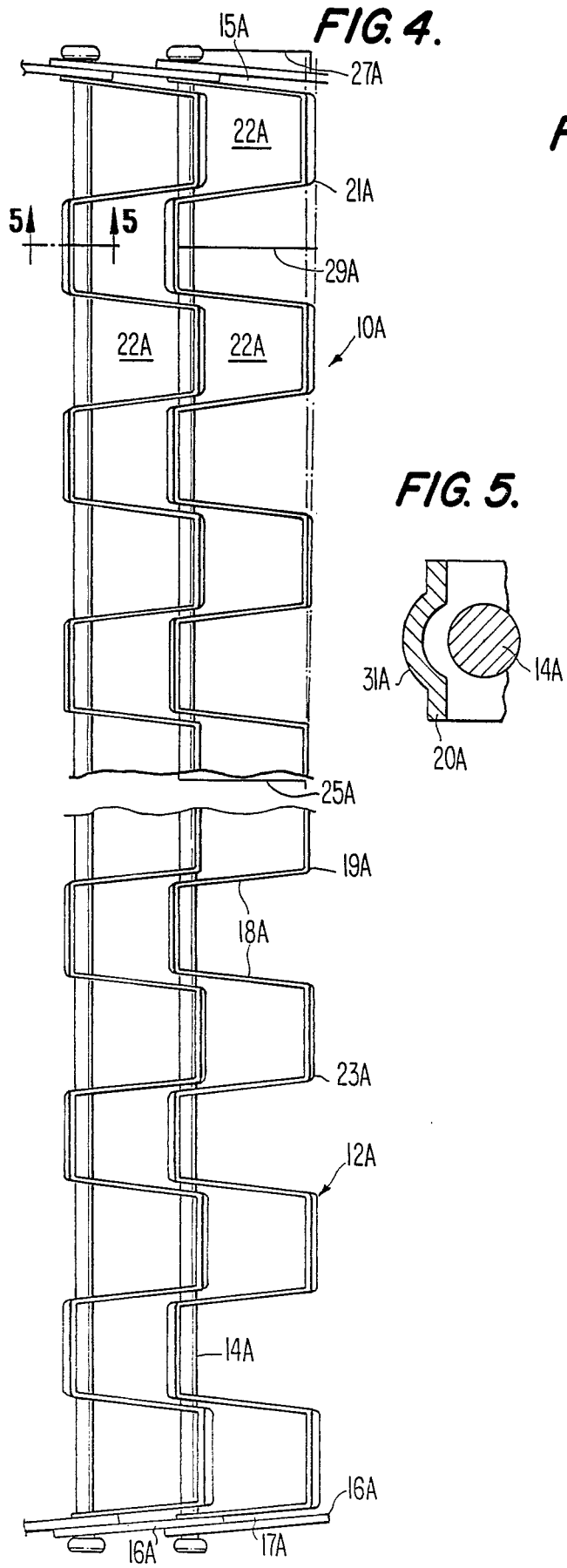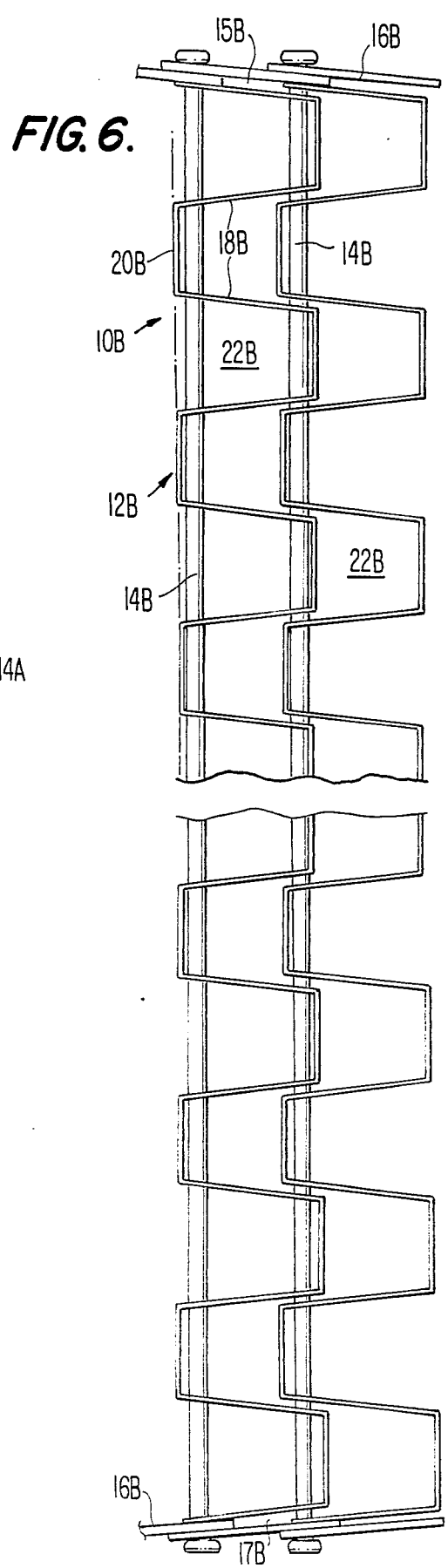

FLAT WIRE CONVEYOR WITH DIFFERENTIAL PITCH

TECHNICAL FIELD

This invention relates to a flat wire conveyor belt having an improved construction for obviating fatigue failure of the tractive pickets of the belt resulting from the repeated elastic deformation of the tractive pickets which occurs when the belt travels around lateral curves. More specifically, the invention concerns a flat wire conveyor belt which utilizes a plurality of slotted bar links positioned along the outer edge of the belt adjacent the tractive pickets in combination with an increased pitch of the tractive pickets adjacent the outer edge.

BACKGROUND OF THE INVENTION

Flat wire conveyor belts are well known as exemplified by U.S. Pat. No. 2,872,023 to Bechtel. Generally, such belts comprise a plurality of tractive pickets or links which are formed to provide a plurality of longitudinally extending tractive members having slots therethrough. A plurality of tractive cross rods or pins extend through the slots for slideably interrconnecting the pickets.

The tractive members of each picket are connected by transversely extending connecting members which form with the tractive members a plurality of wedge-shaped segments. The segments defined by each picket may be nestably received within the segments defined by the longitudinally adjacent pickets, permitting the belt to collapse longitudinally.

When the belt travels around a lateral curve, it collapes longitudinally in a graduated manner across its width. The segments near the inner concave edge of the belt are nestably received further within the longitudinally adjacent segments than are the segments positioned progressively closer to the outer convex edge of the belt. As a result, when the belt travels around lateral curves, the entire tractive load of the belt is carried by a relatively few of the tractive members which are positioned nearest the outer edge.

When this occurs the tractive and connecting members forming the oute portion of each tractive picket are subjected to bending forces which cause elastic deformation or flexure of the picket, particularly at the junctures between the tractive and connecting members. The repeated imposition of such forces and the resulting elastic deformation frequently induces fatigue failure of the tractive links at the aforementioned junctures.

One solution to this fatigue failure problem is disclosed in U.S. Pat. No. 3,261,451 to Roinestad. This patent teaches that tapering the slots in the tractive members through which the cross rods extend, the elastic deformation experienced by the tractive pickets incident to travel of the belt around lateral curves will be distributed over a larger surface area of the pickets to reduce localized fatigue failure at the junctures between the tractive and connecting members. While this solution has proved satisfactory for some conveyor belt installations, it is not obviated to fatigue failure of tractive pickets in installations where the belt carries heavy tractive loads along a tortuous path.

Another solution is fatigue failure problem is disclosed U.S. Pat. No. Re. 27,690 to Roinestad. The solution disclosed in this patent is illustrated in FIGS. 1, 2 and 3 herein. A conveyor belt 10 comprises a plurality of transversely disposed the tractive pickets 12, a plurality of pivotal tractive cross rods 14 which interrconnect the tractive pickets and a plurality of substantially longitudinally disposed bar links 16 positioned adjacent tractive pickets along each edge of belt 10 and connected to the belt by the cross rods 14.

Tractive pickets 12 are fabricated from continuous strips of flat wire and are formed to provide a plurality of integral tractive wire members 18 which extend substantially longitudinally of belt 10. Adjacent ones of the tractive members are connected by integral connecting members 20 which extend substantially transversely of the belt. As shown in FIGS. 1 and 2, adjacent ones of the connecting members 20 extend between opposite ends of the tractive members 18 and the tractive members are slightly laterally inclined so that the tractive and connecting members of each tractive picket 12 form a plurality of alternating oppositely opening wedge-shaped segments 22.

Each tractive member 18 has a pair of longitudinally spaced, longitudinally extending slots 24 extending laterally therethrough it. Cross rods 14 extend through slots 24 to interconnect tractive pickets 12, and are slideable along slots 24 to permit belt 10 to collapse longitudinally, with the wedge-shaped segments 22 defined by one tractive picket being nestably received within the segments defined by the longitudinally adjacent tractive pickets, as shown in FIG. 3. Alternatively, the longitudinally spaced openings in the tractive members may comprise a single longitudinally extending slot and a circular hole, as shown in the aforementioned Bechtel patent, instead of the two longitudinally extending slots 24. In either instance, the belt is permitted to collapse longitudinally incident to the sliding of the cross rods 14 along the slots.

When belt 12 travels along a substantially straight path, as shown in FIG. 1, it extends longitudinally until cross rods 14 engage the bearing surfaces formed by the outer ends of the openings in tractive members 18. The outer ends of slots 24 extend slightly into the adjacent connecting members 20 so that when the belt is fully extended and cross rods 14 are engaged with the outer ends of the slots, the cross rods will abut the flat inner surfaces of the connecting members. As will be apparent, when the cross rods and tractive pickets are so disposed, the tractive load will be substantially equally distributed between the tractive members 18 of each tractive picket 12. The normal direction of belt travel is indicated by arrow 25 in FIG. 1. It is understood that the belt can just as easily travel in the opposite direction.

When belt 10 travels around a lateral curve, as shown in FIG. 3, it collapses longitudinally in a graduated manner across its width with segments 22 nearer the inner concave edge of the belt being nestably received further within the longitudinally adjacent segments than the segments progressively closer to the outer edge of the belt. As a result of such graduated collapsing, cross rods 14 slide away from the outer ends of slots 24 and the inner surfaces of the adjacent connecting members which are nearest the inner edge of the belt so that the tractive members 18 nearest the inner edge of the belt carry substantially none of the tractive load. Consequently, in the absence of bar links 16, the tractive members nearest the outer edge of the belt would carry substantially the entire tractive load. When this occurs tractive members 18 and connecting members 20 nearest the outer edge of the belt will be subjected to bending forces which cause tractive pickets 12 to elastically deform or flex, particularly at the junctures between the tractive and connecting members. Repeated elastic deformation of the tractive pickets induces fatigue failure at the aforementioned junctures, necessitating frequent replacement of the pickets.

This problem is substantially obviated by bar links 16, which, similarly to tractive pickets 12, preferably are fabricated from flat wire. As shown in the drawings, the bar links are substantially longitudinally disposed and are positioned adjacent tractive pickets 12 along each edge of belt 10. Bar links 16 each have a pair of longidinally spaced, longitudinally extending slots 26 extending laterally therethrough, through which cross rods 14 extend for connecting the bar links to the belt. The cross rods are transversely restrained by appropriate means, such as by enlarged head portions 27.

Alternatively, the longitudinally spaced openings in the bar links may comprise a single longitudinally extending slot and a circular hole, similar to the aforementioned alternative openings which may be employed in the tractive members. The slots and the bar links, similarly to the slots in the tractive members permit the belt to collapse longitudinally.

The bar links will carry a tractive load when the cross pins engage the bearing surfaces formed by the outer ends of the openings therein. This occurs when cross rods 14 engage the bearing surfaces formed by the outer ends of slots 26. The longitudinally spacing between the bearing surfaces of each bar link is correlated with the longitudinally spacing between the bearing surfaces of each tractive member so that when the belt travels along a substantially straight path, most of the tractive load of the belt will be carried by the tractive members, and, when the belt travels around a lateral curve, a substantial portion of the tractive load will be carried by the bar links disposed along the outer convex edge of the belt.

Generally, the spacing between the bearing surfaces of each bar link is at least as great, and preferably is greater than the spacing between the bearing surfaces of each tractive member. This longitudinal spacing differential need not be great and generally has been only a few thousandths of an inch. Bar links 16 significantly reduce fatigue failure in flat wire conveyor belts, however, over a period of time, the pitch of the tractive pickets, i.e. the spacing between the bearing surfaces of the tractive members increases. Since the pitch of the bar links is only a few thousandths of a inch greater than the picket pitch, the increase of the picket pitch results in the tractive pickets and the bar links assuming the same pitch. When this condition occurs, the flexing motion which the bar links are intended to eliminate begins to occur and fatigue failure can eventually result. When the outer portion of the tractive pickets takes on tractive load about a curve, particularly in high tractive tension modes of run, portion of the pickets cannot move with respect to the connecting rods. The vibration or movement caused by the motion of a central driving drum with respect to the inner edge of the belt is thus transmitted to the outer portion end of the picket and also contributes to fatigue failure. The present invention is specifically designed to further reduce the liklihood of fatigue failure by the use of edge bar links in combination with tractive pickets specifically designed to assure that tractive load is carried substantially by the edge bar links along the outer convex edge of the belt during travel about lateral curves, even after the pitch of the tractive pickets has increased over a period of time.

SUMMARY OF THE INVENTION

The present invention is directed to a flat wire conveyor belt comprised of a plurality of transversely disposed tractive pickets, a plurality of tractive cross rods and a plurality of bar links. Each tractive picket is formed of a single integral piece of flat wire and has a first end portion adjacent a first transverse edge of the belt and a second end portion adjacent a second transverse edge of the belt. A central portion is located between the end portions, and each picket includes a plurality of alternating oppositely opening nestable segments formed of laterally spaced substantially longitudinally disposed longitudinal members and transversely disposed connecting members connecting adjacent ones of the longitudinal members. A longitudinally extending opening is formed in each of the longitudinal members. The cross rods extend through and are moveable within the openings in the tractive members for pivotally interconnecting the tractive pickets. The tractive pickets are longitudinally collapsible during travel around lateral curves so that the tractive pickets define a concave inner edge along the inside of the lateral curve and a convex outer edge along the outside of the lateral curve. The bar links are independent of the tractive pickets and are arranged in at least one longitudinally extending row along at least one transverse edge of the belt. Each bar link has a longitudinally extending opening. The openings in the longitudinal members in at least the central portion of the tractive pickets have first opposed end surfaces with a first a longitudinal spacing between the first bearing surfaces. The openings in the bar links have second opposed end surfaces with a second longtudinal spacing between the second end surfaces; and the openings in the longitudinal members in the end portion of the tractive pickets located between the edge bar links and the central portion adjacent the convex outer edge have third opposed end surfaces with a third longitudinal spacing between the third surfaces. The second longitudinal spacing is greater than the first longitudinal spacing; and the third longitudinal spacing is greater than both the first longitudinal spacing and greater than the second longitudinal spacing at least in the area immediately adjacent the convex outer edge so that the longitudinal members of the central portion of the tractive pickets carry a substantial tractive load when the belt travels along a substantially straight path, whereby the first opposed end surfaces function as bearing surfaces; the bar links disposed along the outer convex edge of the belt carry a substantial tractive load around lateral curves; and a longitudinal members of the end portion adjacent the convex outer edge carries substantially none of the tractive load in either the substantially straight, or lateral curved, travel of the belt. This spacing relationship assures that flexure and the resultant fatigue failure of the tractive pickets is minimized even after wear of the pickets has caused an increase in the first longitudinal spacing of the first end/bearing surfaces in the central portion of the tractive pickets.

The increased third longitudinal spacing can be formed in either one or both end portions. If the belt is to travel in both laterally left and right directions, the increased third spacing must be formed in both end portions. Even if the belt is to travel around lateral curves in one direction, the increased third longitudinal spacing can be formed in both end portions so that wear on the belt can be evened out by flipping the belt over after a period of time.

Several techniques can be used to accomplish the increased third spacing between the third opposed end surfaces. In one embodiment, the connecting members are reformed or bent away from the adjacent tractive rods so that a depression is formed in the major surface of the connecting members which is substantially aligned with the axis of the adjacent tractive rod. Another technique is to reshape the configuration of the nestable segments of the flat wire in the end portions so that the distance between the connecting members of a given picket is greater in the end portions than the central portion. Finally, a combination of both these techniques can be used so that the major surface of the connecting members is reformed, as well as the configuration of the nestable segments is reshaped to space the connecting members further apart.

This increased spacing or pitch between the third opposed end surfaces in the end portions of the tractive pickets assures that the edge bar links along the outer convex edge of the belt during travel around lateral curves carry substantially all of the tractive load, even after the spacing or pitch of opposed first end surfaces in the central portion of the tractive pickets increases. This significantly enhances the life of a belt over the use of edge bar links alone wherein increase of the pitch of the tractive pickets resulted in the end portions of the tractive pickets assuming some of the load in travel about the lateral curves, with eventual fatigue failure resulting.

Further objects, features and other aspects of this invention will be understood from the following detailed description of the preferred embodiment of this invention referring to the annexed drawings.

BRIEF DESCRIPTION OF THE DRAWINGS

FIG. 4 is a plan view of a flat wire belt of the present invention wnerein tne increased pitch is accomplished by reforming the major surface of the connecting members;

FIG. 5 is an enlarged view taken generally along 5—5 of FIG. 4; and

FIG. 6 is a plan view of a flat wire conveyor belt of the invention wherein the increased pitch is accomplished by reshaping the configuration of the nestable segments.

DETAILED DESCRIPTION OF THE INVENTION

Figure 1:
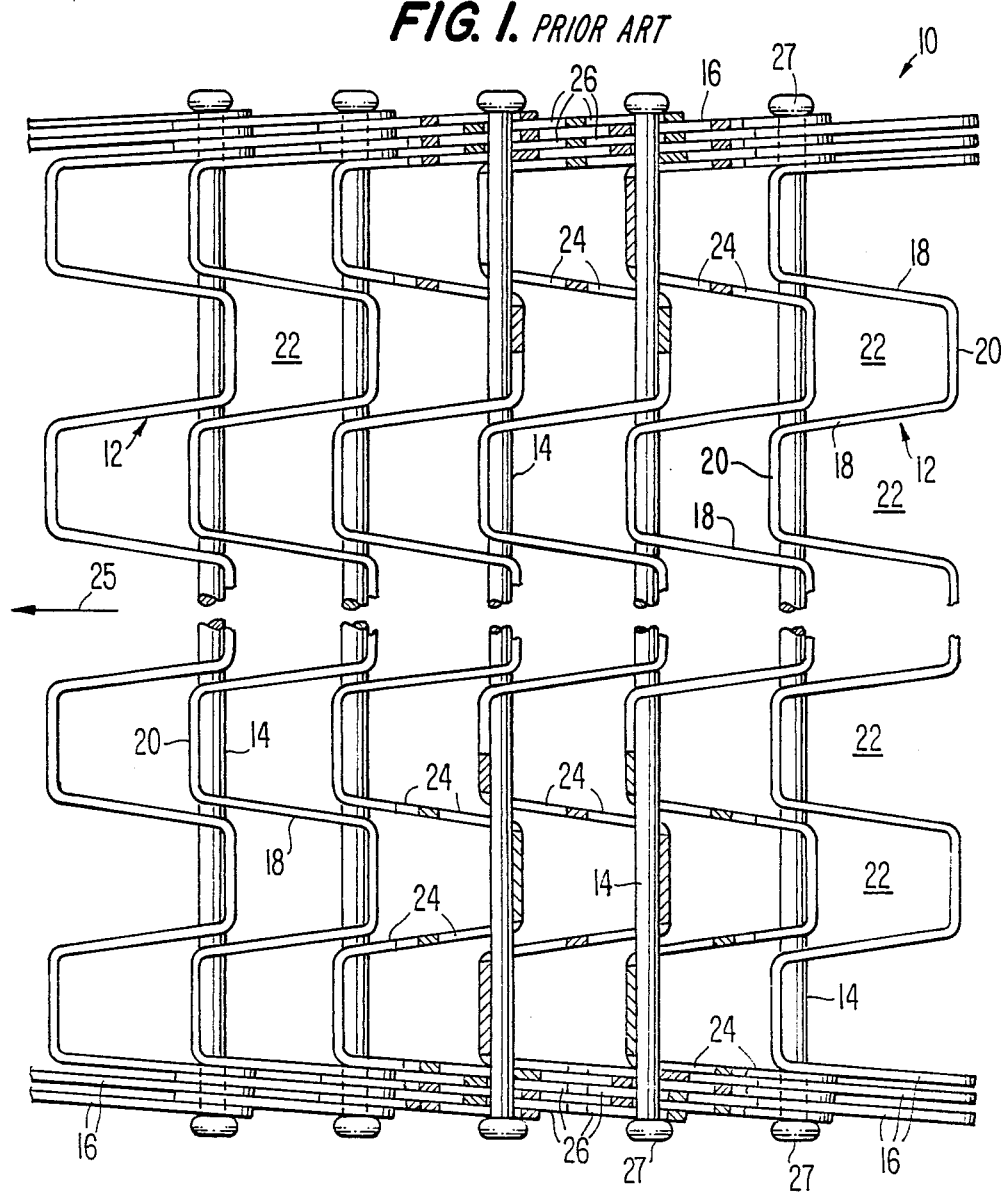
FIG. 1 is a plan view of a prior art flat wire conveyor belt showing the relationship of the elements of the belt when it travels along a substantially straight path, with portions of the belt being shown in section.
Figure 2:
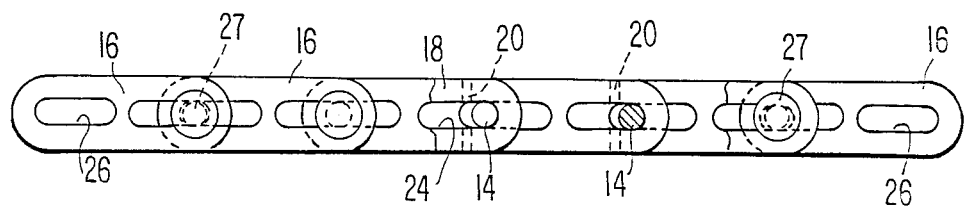
FIG. 2 is an elevational view of the conveyor belt shown in FIG. 1, with portions of the belt being shown in section.
Figure 3:
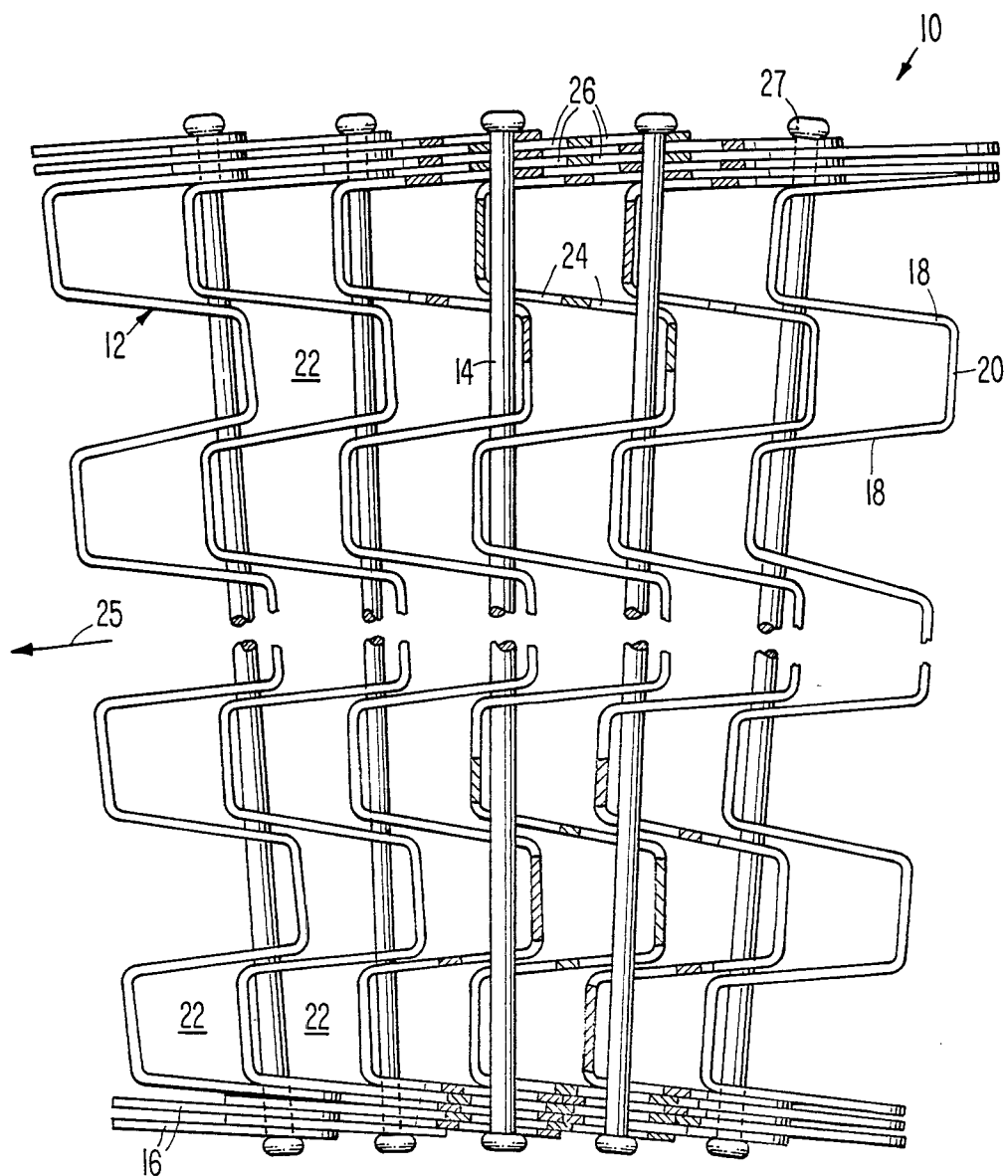
FIG. 3 is a plan view of the conveyor belt shown in FIG. 1 showing the relationship of the structural elements when it travels around a lateral curv with portions of the belt being shown in section.

Referring to FIGS. 4 through 6, wherein like numerals indicate like elements there is shown several embodiments of a flat wire conveyor belt 10A and 10B in accordance with the present invention. In FIG. 4, several tractive pickets 12A of a flat wire conveyor belt 10A are illustrated. Except where noted, conveyor belt 10A has the same construction as conveyor belt 10 discussed above. A tractive cross rod 14A extends through elongate openings in longitudinal members 18A. Members 18A are referred to as longitudinal since the members extend in a substantially longitudinal direction and only specific ones of members 18A are designed to be tractive. Cross rods 14A extend through elongated openings in bar links 16A disposed at either transverse edge 15A, 17A of belt 10A. Each tractive picket 12A includes a central portion 19A (most of which has been broken away in FIG. 4), a first end portion 21A adjacent first edge 15A and a second end portion 23A adjacent second edge 17A. As with belt 10, each picket 10A is formed as a plurality of generally wedge-shaped segments 22A.

The opposed end surfaces in the elongate openings of longitudinal members 18A of central portion 19A have a first longitudinal spacing, defining a first pitch indicated as line 25A. The openings in bar links 16A have opposed end/bearing surfaces with a second longitudinal spacing, defining a second pitch, indicated as line 27A. Opposed end surfaces in openings through longitudinal members 18A in first and second end portions 21A, 23A have a third longitudinal spacing, defining a third pitch.

The first, second and third longitudinal spacings or pitches, have a specific interrelationship to accomplish the objectives of the present invention. First spacing or pitch 25A in central portion 19A is the shortest so that bearing surfaces of openings in wedge-shaped segments 22A in central portion 19A are in contact with cross rods 14A during straight travel of the belt. Second spacing or pitch 27A of bar links 16A is larger than first spacin or pitch 25A to define a gap between the opposed end surfaces of openings in the links and rod 14A during straight travel of the belt. Third spacing or pitch 29A in end portions 21A, 23A is larger than first spacing or pitch 25A, and larger than second spacing or pitch 27A at least in the area immediately adjacent the bar links to define a gap between the opposed surfaces in the openings in the wedge-shaped segments of the end portions and the cross rods during both straight and lateral curved travel of the belt. Such relative spacings or pitches, assure that longitudinal members 18A of the wedge-shaped segments 22A in central portion 19A carry substantially all of the tractive load when the belt travels along a substantially straight path, while bar links 16A located along an outer convex edge carry a substantial tractive load when the belt proceeds around lateral curves, and longitudinal members 18A of the wedge-shaped segments 22A in end portions 21A, 23A carry substantially none of the tractive load in either the substantially straight travel of the belt, or the travel around lateral curves.

In the embodiment illustrated in FIG. 4, the openings in longitudinal members 18A in both end portions 21 and 23A have opposed surfaces with the extended spacing 29A. However, if belt 10A is designed to go around curves in only one direction, one of the end portions 21A or 23A could have opposed surfaces with spacing 25A to distribute the tractive load in straight line travel across both the central portion and the respective end portion with spacing 25A. In such a construction, several wedge-shaped segments adjacent to outer convex edge of the belt would never be tractive, while the remainder of the wedge-shaped segments would carry substantially all the tractive load in straight travel of the belt.

Also, as seen in FIG. 4, third spacing 29A is not constant, but decreases from a maximum adjacent transverse edge 15A to a minimum adjacent central portion 19A. Alternatively, third spacing 29A can be made constant throughout the respective end portions. All that is required is that the respective end portion does not assume any tractive load in lateral curved motion of belt 10A, even after normal wear or increasing of tractive pitch 25A has occurred. This typically would be accomplished by a difference of five thousandths of an inch between the first and third spacings. Also, as illustrated in FIG. 4, four connecting members 20A are located in each end portion. This number can vary from two or more but typically is three or four connecting members for a typical range of belt widths of 30 to 60 inches. The number must be sufficient to assure that when the belt moves from straight line to lateral curved travel, tractive load is assumed by bar links 16A without flexure occurring in the tractive pickets. To accomplish this the second and third spacings must be greater than the first spacing, and the third spacing must be greater than the second spacing at least in the area immediately adjacent the bar links. However, in the embodiment where the third spacing decreases from the outside edge, the third spacing can decrease to the point where it is equal to or less than the second spacing as long as a gap is maintained between the cross rods and the adjacent surface of the openings in the pickets during lateral curved travel of the belt. Finally, while a single row of bar links 16A are illustrated in FIG. 4, any suitable number of rows of bar links can be used.

FIG. 5 illustrates in detail one preferred technique for accomplishing the increased longitudinal spacing 29A, which is utlized in the embodiment of FIG. 4. A portion of the major surface of connecting member 20A is bent or depressed to form a depression 31A in the major surface of connecting member 20A. A gap is thus formed between tractive rod 14A and connecting member 20A in the area of depression 31A. Depression 31A extends transversely of belt 10A substantially along the axis of rod 14A. In FIG. 4, depressions 31A are formed in the connecting members along both longitudinal ends of each tractive picket 12A. However, depressions 31A only have to be formed along one longitudinal end of each picket 12A.

FIG. 6 illustrates another technique for forming the extended spacing 29A. Rather than form depressions in the major surface of the connecting members 20B, the configuration of the nestable wedge-shaped segments 22B in the respective end portions is reshaped to be different from the nestable wedge-shaped segments 22B in central portion 19B in a manner to space connecting members 20B in the respective end portions further apart than in cental portion 19B to thus form a gap between these wedge-shaped segments and the cross rod. For example, the reshaping can be accomplished by changing the angle at which longitudinal members 18B slant, or by changing the length of connecting members 20B. A combination of the techniques illustrated in FIGS. 5 and 6 can also be used. For example, during the formation of depressions 31A, a slight reshaping of the configuration of the nestable segments can occur so that the gap formed between tractive rod 14A and connecting members 20A is a result of both the formed depression and a reshaping of the nestable segments.

This invention has been described in detail in connection with preferred embodiments. These embodiments, however, are merely for example only and the invention is not restricted thereto. It will be easily understood by those skilled in the art that other variations and modifications can easily be made within the scope of this invention, as defined by the appended claims.

I claim:

1. A flat wire conveyor belt comprising:
   a plurality of transversely disposed tractive pickets, each picket being formed of a single integral piece of flat wire, each picket having a first end portion adjacent a first transverse end of the belt, a second end portion adjacent a second transverse edge of the belt and a central portion between said end portions, each picket including a plurality of alternating oppositely opening nestable segments formed of laterally spaced substantially longitudinally disposed longitudinal members and transversely disposed connecting members connecting adjacent ones of said longitudinal members, each of said longitudinal members having a longitudinally extending opening;
   a plurality of tractive cross rods extending through and being movable longitudinally within the openings in said tractive members for pivotably interconnecting said tractive pickets and permitting longitudinal collapsing of the belt during travel around lateral curves so that the tractive pickets define a concave inner edge along the inside of the lateral curve and a convex outer edge along the outside of the lateral curve;
   a plurality of substantially longitudinally disposed bar links independent of said tractive pickets, said bar links being positioned adjacent, the tractive pickets and arranged in at least one longitudinally extending row along at least one transverse edge of the belt, each bar link having a longitudinally extending opening;
   the openings in said longitudinal members in at least said central portion of said tractive pickets having first opposed end surfaces with a first longitudinal spacing between the first end surfaces, the openings in said bar links having second opposed end surfaces with a second longitudinal spacing between the second end surfaces, and the openings in said longitudinal members in the end portion of said tractive pickets located between said bar links and said central portion adjacent the convex outer edge having third opposed end surfaces with a third longitudinal spacing between the third surfaces; and
   said second longitudinal spacing being greater than said first longitudinal spacing, and said third longitudinal spacing being greater than said first longitudinal spacing and greater than said second longitudinal spacing at least in the area immediately adjacent said convex outer edge so that the longitudinal members of said central portion of said tractive pickets carry substantially all the tractive load when the belt travels along a substantially straight path, the bar links disposed along the convex outer edge of the belt carry substantially all the tractive load when the belt travels around lateral curves, and the longitudinal members of the end portion adjacent the convex outer edge carry substantially none of the tractive load in either the straight or lateral curved travel of the belt, to minimize flexure and resultant fatigue failure of the tractive pickets even after wear of the pickets has caused an increase in the first longitudinal spacing.

2. A flat wire conveyor belt in accordance with claim 1 wherein both said first and second end portions of each tractive picket have longitudinal openings with opposed end surfaces separated by said third longitudinal spacing, and including said bar links disposed along both transverse edges of the belt with opposed end surfaces separated by said second longitudinal spacing so that said belt can travel around lateral curves in either the right and left direction with the longitudinal members of said central portion of said tractive pickets carrying substantially all the tractive load when the belt travels along a substantially straight path, and the longitudinal members of both the first and second end portions of said tractive picket carry substantially none of the tractive load in the substantially straight travel of the belt or the lateral curved travel of the belt in either the left or right direction.

3. A flat wire conveyor belt in accordance with claim 1 or 2 wherein said third spacing is substantially the same throughout the respective end portions of said tractive pickets.

4. A flat wire conveyor belt in accordance with claim 1 or 2 wherein said third spacing gradually decreases within a respective end portion from a respective edge of said belt to said central portion of said belt.

5. A flat wire conveyor belt in accordance with claim 1 or 2 wherein said greater third spacing is formed by a bend in the surface of said connecting members away from the adjacent tractive rods to form a gap between the bend in the connecting members and the tractive rod when the central portion of said tractive pickets is under tractive load.

6. A flat wire conveyor belt in accordance with claim 5 wherein said bend in the surface of said connecting member is formed as a depression within the major surface of said connecting members facing said adjacent tractive rod.

7. A flat wire conveyor belt in accordance with claim 6 wherein said depressions are curved and have an axis substantially aligned with the axis of said tractive rod.

8. A flat wire conveyor belt in accordance with claim 5 wherein said third spacing is substantially the same throughout the respective end portions.

9. A flat wire conveyor belt in accordance with claim 5 wherein said third spacing gradually decreases within a respective end portion from a respective edge of said belt to said central portion of said belt.

10. A flat wire conveyor belt in accordance with claim 1 or 2 wherein said greater third spacing is formed by shaping the nestable segment of each tractive picket in the respective end portions different from the shape of the nestable segments in the central portion to space the connecting members further from one another in the respective end portions than in the central portion.

11. A flat wire conveyor belt in accordance with claim 10 wherein said further spacing of said connecting members is uniform in the respective end portions.

12. A flat wire conveyor belt in accordance with claim 5 wherein said bends are formed in the connecting members on each longitudinal end of each tractive picket.

13. A flat wire conveyor belt in accordance with claim 11 wherein said further spacing of said connecting members gradually decreases from the connecting member adjacent an edge of said belt toward said central portion of said belt.

14. A flat wire conveyor belt in accordance with claim 5 wherein said greater third spacing is further formed by shaping the nestable segments of each tractive picket in the respective end portions different from the shape of the nestable segments in the central portion to space the connecting members further from one another in the respective end portions than in the central portion.

15. A flat wire conveyor belt in accordance with claim 6 wherein said greater third spacing is further formed by shaping the nestable segments of each tractive picket in the respective end portions different from the shape of the nestable segments in the central portion to space the connecting members further from one another in the respective end portions than in the central portion.

16. A flat wire conveyor belt comprising a plurality of tractive pickets, a plurality of connecting cross rods, and a plurality of bar links, each tractive picket being formed of an integral piece of flat wire having a plurality of generally wedge-shaped segments for nestably receiving wedge-shaped segments from an adjacent picket, each tractive picket having elongate openings for slidably receiving one of said cross rods to slidably connect adjacent tractive pickets to one another and to allow a graduated nesting of said wedge-shaped segments from an inner concave edge of the belt to an outer convex edge of the belt, each integral piece of flat wire extending between an area adjacent the inner concave edge of the belt and an area adjacent the outer convex edge of the belt said bar links being connected to said cross rods in at least one row along at least one edge of the belt through elongate openings in said bar links, said at least one row of bar links being located along said outer convex edgte, the elongate openings in said wedge-shaped segments adjacent said outer edge defining a gap between said connecting cross rod and an adjacent surface of said last-mentioned openings during both straight and lateral curved travel of the belt, the elongate openings in the remainder of said wedge-shaped segments being in contact with said connecting cross rod during straight travel of the belt, and the elongate openings in said bar links defining a gap between said connecting cross rod and an adjacent surface of said openings in said bar links during straight travel of the belt so that the remainder of said wedge-shaped segments carry substantially all of the tractive load during substantially straight travel of the belt, the bar links carry substantially all of the tractive load during travel around lateral curves, and said wedge-shaped segments adjacent said outer convex edge of the belt never carry a substantial tractive load. .

17. A flat wire conveyor belt in accordance with claim 16 wherein said at least one row of bar links is disposed along each edge of said belt and said several of said wedge-shaped segments with said gap are adjacent both of the edges of the belt.

18. A flat wire conveyor belt in accordance with claim 16 or 17 wherein said gap is substantially the same throughout said several wedge-shaped segments.

19. A flat wire conveyor belt in accordance with claim 16 or 17 wherein said gap gradually decreases from a respective edge of said belt toward said remainder of said wedge-shaped segments.

20. A flat wire conveyor belt in accordance with claim 16 or 17 wherein said gap is formed by a bend in the surface of said several wedge-shaped segments away from the adjacent tractive rods to form the gap between the bend in the wedge-shaped segments and the tractive rod when the remainder of said wedge-shaped segments are under tractive load 21. A flat wire conveyor belt in accordance with claim 20 wherein said bend in said several wedge-shaped segments is formed as a depression within a major surface of said several wedge-shaped segments facing said adjacent tractive rod 22. A flat wire conveyor belt in accordance with claim 21 wherein said depressions are curved and have an axis substantially aligned with the axis of said tractive rod.

23. A flat wire conveyor belt in accordance with claim 16 or 17 wherein said gap is formed by shaping the several wedge-shaped segments of each tractive picket different from the shape of the remainder of said wedge-shaped segments.

24. A flat wire conveyor belt in accordance with claim 20 wherein said gap is further formed by shaping the several wedge-shaped segments of each tractive picket different from the shape of the remainder of said wedge-shaped segments.

* * * * *